Jan. 21, 1936.  G. VAN YAHRES  2,028,483
TURF TOOL
Filed Feb. 15, 1935
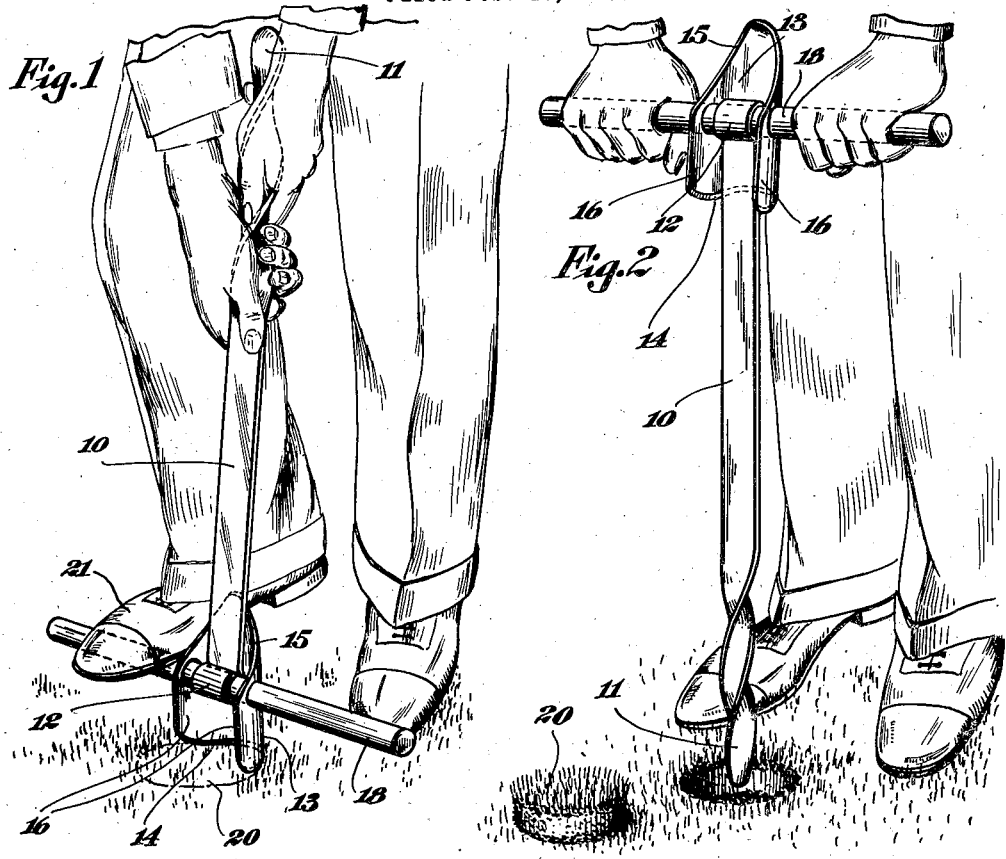
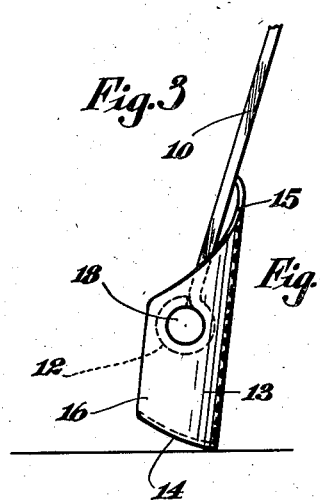
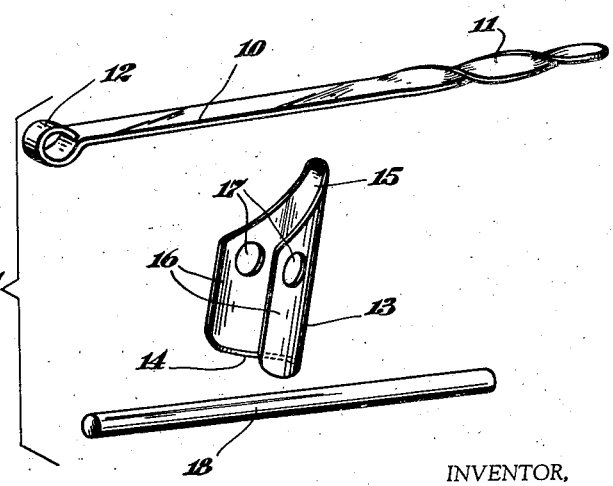
INVENTOR,
George Van Yahres,
BY
Frederick Breitenfeld
ATTORNEY.

Patented Jan. 21, 1936

2,028,483

UNITED STATES PATENT OFFICE 2,028,483

TURF TOOL

George Van Yahres, Westbury, N. Y.

Application February 15, 1935, Serial No. 6,630

6 Claims. (Cl. 55—18)

My present invention relates generally to gardening implements, and has particular reference to an improved tool for cutting and boring turf.

The proper care of trees requires that, from time to time, fertilizer or "tree food" be supplied to the roots. The customary method is to form a number of holes in the ground surrounding the tree, and to insert the fertilizer into these holes, preferably in the form of a cartridge. So far as I know, no special tool has ever been required or used for this purpose, and the holes have been formed rather crudely by means of crow bars or the like. When the tree happens to be situated on a lawn, the preservation of the lawn requires the additional step of preliminarily removing portions of the sod before forming the holes.

It is a general object of my present invention to provide an inexpensive, simple, yet highly efficient implement, adapted to be used by even the most unskilled person for the purpose of enabling him to form holes of the character mentioned in an expeditious manner.

It is a particular feature of my invention to provide a combination tool which may be used selectively as a turf borer or auger, or as a turf or sod cutter.

In a preferred embodiment of my invention, the tool consists of only three elements which are so shaped and formed that they cooperate with one another to hold the tool in assembled condition, without the requirement for any extraneous bolts, clamps, or the like.

Briefly, a preferred form of tool constructed in accordance with my invention comprises a metallic bar with one end twisted to form a sort of auger or turf borer, a transverse rod mounted on the opposite end of the bar, and a cutting blade mounted on the rod. The parts are so constructed and assembled that when the tool is used as a turf cutter, the bar serves as a convenient handle, the twisted end forming a hand grip, and the rod serves to receive the foot of the user; and when the tool is used as a turf borer or auger, nothing more is required than to turn the tool upside down, whereupon the rod serves as a cross-handle and the twisted end fulfills a turf-boring function.

Other features of my invention are pointed out more fully hereinafter and reside in the unique and simplified manner of uniting the several parts in cooperative relationship; in the provision of an arrangement for bracing the blade when it is in use; and for permitting the blade to assume an inoperative position when not in use; and in the mode of assembly which permits the device to be conveniently taken apart for purposes of shipment.

I achieve the foregoing objects, and such other objects and advantages as may hereinafter appear or be pointed out, in the manner illustratively exemplified in the accompanying drawing, wherein—

Figure 1 is a perspective view showing a preferred form of the present tool used as a turf cutter;

Figure 2 is a view similar to Figure 1, showing the tool employed as an auger or turf borer;

Figure 3 is a side elevation of the lower portion of the tool as shown in Figure 1; and Figure 4 is an exploded view of the three elements of the construction.

The bar 10 is composed of a metal strip approximately two to three feet long, and has one end 11 twisted to form a hand grip and also adapted to serve as a turf borer or auger. The opposite end is bent into the form of a transverse loop 12. The cutting blade 13 is a flat piece of metal bent into substantially cylindrical form and having a substantially semi-circular cross-section. The operative edge 14 is somewhat attenuated to serve as a cutting instrumentality. The opposite end is shaped to form a relatively blunt tail portion 15. The two lateral portions 16 of this element are provided with holes 17 which are substantially equal in diameter to that of the loop 12, so that they may be brought into alignment with this loop on opposite sides of the latter, respectively, when the parts are assembled.

The third element of the preferred construction is a rod 18 which is preferably of circular cross-section.

The three elements illustrated in Figure 4 may be conveniently tied together in a compact manner which permits the tool to be shipped with facility. In assembling the tool, it is merely necessary to align the openings 17 with the loop 12 and to thread the rod 18 through these openings and loop, thereby placing the parts in the relationship most clearly shown in Figures 1 and 2.

Assuming that the tool is to be used in the provision of holes for receiving fertilizer, to feed a tree located on a lawn, the tool is first wielded in the manner illustrated in Figure 1, whereby small circular portions of sod 20 may be conveniently cut and removed. The user grasps the tool in the manner shown in Figure 1, the bar 10 serving as a handle and the twisted end 11 serving as a hand grip. The cutting edge 14 of the blade 13 is disposed downwardly, and the rod 18 serves to receive the foot 21 of the user, whereby pressure upon this foot will press the cutting blade downwardly into the sod.

During this cutting action, the rear blunted end of the blade braces itself against the rear surface of the bar 10, as shown most clearly in Figure 3 and it is to be noted that this bracing action occurs after the blade 13 has been swung slightly beyond the dead center of its operative position. In other words, upon viewing Figure 3, it will be obvious that pressure downwardly upon the rod 18 will force the cutting edge 14 into the turf without any danger of having the blade collapse into a horizontal inoperative position during the process.

The parts are so proportioned and assembled, however, that the blade is rotatable around the rod 18, and after the last cut has been made it is preferable to manipulate the bar 10 so that the axis of rotation falls behind the cutting edge. This collapses the blade into a horizontal position and serves as a very convenient method for forcing the cutting edge beneath one edge of the sod 20, thereby loosening the latter and permitting it to be removed.

The user is then ready to bore a hole into the turf that is exposed. To accomplish this, he swings the tool into the position of Figure 2; applies the twisted end of the bar to the turf; and grasps the rod 18 with both ends and uses the rod as a cross-handle for turning the bar. The blade is purposely constructed in a manner whereby its center of gravity lies nearer to cutting edge 14, as a result of which it automatically assumes the position of Figure 2. It will be observed that the cutting edge 14 is, in Figure 2, in a relatively protected position.

After the desired hole has been bored, the fertilizer, such as a tree food cartridge or the like, is inserted into the hole; the turf is tamped down over it; and the piece of sod 20 is replaced. By means of the present tool, dozens of these holes may be provided with great ease around a tree, without materially injuring the lawn, and without the expenditure of any unusual amount of effort.

From certain aspects, it will be readily appreciated that the invention is not restricted to the preferred form of employment herein chosen for illustration. For example, the blade may have its rear portion 15 permanently secured to the bar 10 by any suitable means, thereby dispensing with the rotatable relationship of rod and blade. Also, the blade may be shaped other than from a normally flat blank of metal; it may be curved by a greater or lesser degree; and it may be mounted on the rod 18 in any convenient manner other than that illustrated herein.

It will also be understood that the combination of bar, rod, and blade, independent of the twisted end of the bar, constitutes by itself a novel arrangement of elements admirably adapted for cutting turf in a simple and efficient manner.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. A turf tool comprising a bar having one end bent into a transverse loop, a curved blade having lateral portions, said portions having openings adapted to be brought into alignment with said loop on opposite sides of the latter, respectively, and a rod adapted to be threaded through said openings and loop to mount the rod on the bar and the blade on said rod.

2. A turf tool comprising a bar having one end bent into a transverse loop, a blade of substantially semi-circular cross-section having openings adapted to be brought into alignment with said loop on opposite sides of the latter, respectively, and a rod adapted to be threaded through said openings and loop to mount the rod on the bar and the blade on said rod, said blade being rotatable on said rod and having a tail portion adapted to abut against said bar when the blade is swung slightly beyond the dead center of its projecting position.

3. A combination turf tool, comprising a bar, a turf-cutting curved blade at one end of the bar, a transverse rod carried by the bar and adapted to receive the foot when the blade is pressed into the turf, the free end of the bar being twisted to form a hand grip, said twisted end being also adapted to serve as a turf borer when the tool is reversed, said rod thereupon serving as a cross-handle.

4. A combination turf tool, as defined in claim 3, coupled with a means for swinging the blade into an inoperative position alongside of said bar whenever the twisted end of the bar is used as a turf borer.

5. A combination turf tool, comprising a bar, a turf-cutting curved blade at one end of the bar, a transverse rod carried by the bar and adapted to receive the foot when the blade is pressed into the turf, said blade having lateral portions engaging around said rod on opposite sides of the bar, the free end of the bar being twisted to form a hand grip, said twisted end being also adapted to serve as a turf borer when the tool is reversed, said rod thereupon serving as a cross-handle.

6. A combination turf tool, as defined in claim 5, wherein said blade is rotatable around said rod and has a relatively blunt tail portion adapted to abut said bar when the blade is swung into operative position.

GEORGE VAN YAHRES.